US012811882B2

(12) United States Patent
Moshref Javadi et al.

(10) Patent No.: US 12,811,882 B2
(45) Date of Patent: Nov. 24, 2026

(54) CONGESTION CONTROL FOR NETWORKS USING DEPLOYABLE INT

(71) Applicant: Google LLC, Mountain View, CA (US)

(72) Inventors: Masoud Moshref Javadi, San Jose, CA (US); Weitao Wang, Houston, TX (US); Yuliang Li, Sunnyvale, CA (US); Gautam Kumar, Fremont, CA (US); Nandita Dukkipati, Palo Alto, CA (US); Neal Douglas Cardwell, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/135,995

(22) Filed: Apr. 18, 2023

(65) Prior Publication Data

US 2023/0336483 A1 Oct. 19, 2023

Related U.S. Application Data

(60) Provisional application No. 63/332,421, filed on Apr. 19, 2022.

(51) Int. Cl.
*H04L 47/12* (2022.01)
*H04L 47/11* (2022.01)

(52) U.S. Cl.
CPC .............. *H04L 47/12* (2013.01); *H04L 47/11* (2013.01)

(58) Field of Classification Search
CPC ................................. H04L 47/12; H04L 47/11
See application file for complete search history.

(56) References Cited

U.S. PATENT DOCUMENTS

| | | | | |
|---|---|---|---|---|
| 7,027,410 | B2 | 4/2006 | Zavalkovsky et al. | |
| 9,288,146 | B1 | 3/2016 | Kabbani et al. | |
| 10,158,574 | B2 | 12/2018 | Katevenis | |
| 11,258,719 | B1 | 2/2022 | Sommers | |
| 2005/0213586 | A1* | 9/2005 | Cyganski | H04L 47/28 370/395.41 |
| 2007/0280245 | A1 | 12/2007 | Rosberg | |
| 2016/0087899 | A1 | 3/2016 | Katevenis | |
| 2016/0127238 | A1* | 5/2016 | McCollum | H04L 47/10 709/224 |
| 2019/0089645 | A1* | 3/2019 | Fu | H04L 47/28 |
| 2021/0007004 | A1* | 1/2021 | Xu | H04W 28/22 |
| 2021/0112002 | A1 | 4/2021 | Pan et al. | |

(Continued)

FOREIGN PATENT DOCUMENTS

| | | |
|---|---|---|
| CN | 101529821 | 9/2009 |
| CN | 106533970 A | 3/2017 |

(Continued)

OTHER PUBLICATIONS

HPCC: High Precision Congestion Control (Year: 2019).*

(Continued)

*Primary Examiner* — Glenton B Burgess
(74) *Attorney, Agent, or Firm* — Lerner David LLP

(57) ABSTRACT

An aspect of the disclosed technology is a computing system that implements a congestion control (CC) protocol that exploits and extends in-network telemetry (INT) to address, for example, blind spots typically found in end-to-end algorithms, determines CC for an actual bottleneck hop, realizes low queuing delay, and/or realizes convergence to network-wide max-min fair bandwidth allocation.

16 Claims, 10 Drawing Sheets

500

(56) References Cited

U.S. PATENT DOCUMENTS

| | | | | |
|---|---|---|---|---|
| 2021/0211939 | A1* | 7/2021 | Teyeb | H04W 28/12 |
| 2021/0218651 | A1* | 7/2021 | Rangarajan | H04W 28/10 |
| 2022/0264371 | A1* | 8/2022 | Strasman | H04L 47/28 |

FOREIGN PATENT DOCUMENTS

| | | | | | |
|---|---|---|---|---|---|
| CN | 110505112 | A | | 11/2019 | |
| CN | 112291747 | A | * | 1/2021 | H04W 28/0289 |
| CN | 110505112 | B | | 6/2021 | |
| DE | 102018005850 | A1 | | 2/2019 | |
| EP | 1417808 | B1 | * | 1/2007 | H04L 47/10 |
| KR | 20210060187 | A1 | * | 11/2019 | H04L 45/08 |
| KR | 20210060187 | A | | 5/2021 | |

OTHER PUBLICATIONS

Extended European Search Report for European Patent Application No. 23168586.8 dated Aug. 11, 2023. 15 pages.
Li et al. HPCC: High Precision Congestion Control. Data Communication, ACM, 2 Penn Plaza, Suite 701 New York, NY 10121-0701 USA, Aug. 19, 2019 (Aug. 19, 2019), pp. 44-58.
"How Distributed Shuffle improves scalability and performance in Cloud Dataflow pipelines" [online]. Sep. 11, 2018. Retrieved from the internet: <https://cloud:google:com/blog/products/dataanalytics/how-distributed-shuffle-improvesscalability-and-performance-cloud-dataflowpipelines>, 6 pages.
"In-band Network Telemetry (INT) Dataplane Specification, Version 2.1." Nov. 11, 2020. Retrieved from the internet: <https://p4:org/p4-spec/docs/INT_v2_1:pdf>, 56 pages.
"Amazon Elastic Compute Cloud: Linux accelerated computing instances: Network performance" [online]. Retrieved from the internet: <https://docs:aws:amazon.com/AWSEC2/latest/UserGuide/accelerated-computinginstances:html#gpu-network-performance>, 2 pages.
"Google Cloud Documentation: Encryption in Transit" [online]. Retrieved from the internet: <https://cloud:google.com/security/encryption-in-transit>, 21 pages.
"Tomahawk4 / BCM56990 Series" [online]. Retrieved from the internet: <https://www:broadcom:com/products/ethernetconnectivity/switching/strataxgs/bcm56990-series>, 3 pages.
"GitHub: psp-open-source-project—README" [online]. Retrieved from the internet: <https://github:com/google/psp>, 3 pages.
Vamsi Addanki, Oliver Michel, and Stefan Schmid, "PowerTCP: Pushing the Performance Limits of Datacenter Networks," In the Proceedings of the 19th USENIX Symposium on Networked Systems Design and Implementation (NSDI '22), pp. 51-70, Renton, WA, USA, 2022. 21 pages.
Mohammad Alizadeh, Albert Greenberg, David A. Maltz, Jitendra Padhye, Parveen Patel, Balaji Prabhakar, Sudipta Sengupta, and Murari Sridharan, "Data Center TCP (DCTPC)," SIGCOMM '10, 2010. 12 pages.
Emmanuel Amaro, Christopher Branner-Augmon, Zhihong Luo, Amy Ousterhout, Marcos K. Aguilera, Aurojit Panda, Sylvia Ratnasamy, and Scott Shenker, "Can Far Memory Improve Job Throughput?" In the Proceedings of the Fifteenth European Conference on Computer Systems, (EuroSys '20) Apr. 2020, Article 14, pp. 1-16.
Mina Tahmasbi Arashloo, Alexey Lavrov, Manya Ghobadi, Jennifer Rexford, David Walker, and David Wentzlaff, "Enabling Programmable Transport Protocols in High-Speed NICs," In the Proceedings of the 17th USENIX Symposium on Networked Systems Design and Implementation (NSDI '20), Feb. 2020, pp. 93-109, Santa Clara, CA, USA. 18 pages.
Serhat Arslan, Stephen Ibanez, Alex Mallery, Changhoon Kim, and Nick McKeown, "NanoTransport: A Low-Latency, Programmable Transport Layer for NICs," In Proceedings of the ACM SIGCOMM Symposium on SDN Research (SOSR) (SOSR '21), 2021, pp. 13-26, New York, NY, USA. 14 pages.
Venkat Arun and Hari Balakrishnan, "Copa: Practical Delay-Based Congestion Control for the Internet." In the Proceedings of the 15th USENIX Symposium on Networked Systems Design and Implementation (NSDI '18), pp. 329-342, Renton, WA, USA, 2018. 15 pages.
Sanjeewa Athuraliya, Steven H Low, Victor H Li, and Qinghe Yin, "REM: Active Queue Management," IEEE Network, 15(3):48-53, 2001.
Uiz Barroso, Mike Marty, David Patterson, and Parthasarathy Ranganathan, "Attack of the Killer Microseconds," Communications of the ACM, 60(4):48-54, 2017.
Ran Ben Basat, Sivaramakrishnan Ramanathan, Yuliang Li, Gianni Antichi, Minlan Yu, and Michael Mitzenmacher, "PINT: Probabilistic In-band Network Telemetry." SIGCOMM '20, pp. 662-680, Aug. 2020. 19 pages.
Mark Handley, Costin Raiciu, Alexandra Agache, Andrei Voinescu, Andrew W. Moore, Gianni Antichi, and Marcin Wójcik, "Re-architecting datacenter networks and stacks for low latency and high performance," In Proceedings of the Conference of the ACM Special Interest Group on Data Communication (SIGCOMM '17), pp. 29-42, Los Angeles, CA, USA, 2017. 14 pages.
Neal Cardwell, Yuchung Cheng, Kevin Yang, Soheil Hassas Yeganeh, Priyaranjan Jha, Yousek Seung, Luke Hsiao, Matt Mathis, Van Jacobson, Ian Swett, Bin Wu, Victor Vasiliev, Nandita Dukkipati, and Gautam Kumar, "BBR Update: 1: BBR.Swift; 2: Scalable Loss Handling," Nov. 2020, Retrieved from the internet: <https://datatracker.ietf.org/meeting/109/materials/slides-109-iccrg-update-on-bbrv2-00.>, 21 pages.
Neal Cardwell, Yuchung Cheng, C. Stephen Gunn, Soheil Hassas Yeganeh, and Van Jacobson, "BBR: Congestion-Based Congestion Control," ACM Queue, Sep.-Oct. 2016, pp. 20-53.
Dah-Ming Chiu and Raj Jain, "Analysis of the Increase and Decrease Algorithms for Congestion Avoidance in Computer Networks," Computer Networks and ISDN Systems, 17(1):1-14, 1989.
Jeffrey Dean and Luiz Andre Barroso, "The Tail at Scale," Communications of the ACM, 56(2):74-80, 2013.
Arjun Singh, Joon Ong, Amit Agarwal, Glen Anderson, Ashby Armistead, Roy Bannon, Seb Boving, Gaurav Desai, Bob Felderman, Paulie Germano, Anand Kanagala, Jeff Provost, Jason Simmons, Eiichi Tanda, Jim Wanderer, Urs Hölzle, Stephen Stuart, and Amin Vahdat, "Jupiter Rising: A Decade of Clos Topologies and Centralized Control in Google's Datacenter Network," In Proceedings of the 2015 ACM Conference on Special Interest Group on Data Communication (SIGCOMM '15), pp. 183-197, New York, NY, USA, 2015. 15 pgs.
Shizhen Zhao, Rui Wang, Junlan Zhou, Joon Ong, Jeffrey C. Mogul, and Amin Vahdat, "Minimal Rewiring: Efficient Live Expansion for Clos Data Center Networks," In the Proceedings of the 16th USENIX Symposium on Networked Systems Design and Implementation (NSDI '19), pp. 221-234, Boston, MA, USA, 2019. 15 pages.
Junlan Zhou, Malveeka Tewari, Min Zhu, Abdul Kabbani, Leon Poutievski, Arjun Singh, and Amin Vahdat, "WCMP: Weighted Cost Multipathing for Improved Fairness in Data Centers," In Proceedings of the Ninth European Conference on Computer Systems (EuroSys 2014), Amsterdam, NL, Article 5, 2014. 14 pages.
Behnam Montazeri, Yilong Li, Mohammad Alizadeh, and John Ousterhout, "Homa: A Receiver-Driven Low-Latency Transport Protocol Using Network Priorities," In Proceedings of the 2018 Conference of the ACM Special Interest Group on Data Communication (SIGCOMM '18), Budapest, HU, 2018. 15 pages.
Mubashir Adnan Qureshi, Yuchung Cheng, Qianwen Yin, Qiaobin Fu, Gautam Kumar, Masoud Moshref, Junhua Yan, Van Jacobson, David Wetherall, and Abdul Kabbani, "PLB: Congestion Signals are Simple and Effective for Network Load Balancing," In Proceedings of the ACM SIGCOMM Conference (SIGCOMM '22), pp. 207-218, Amsterdam, NL, 2022. 12 pages.
Office Action for European Patent Application No. 23168586.8 dated Oct. 7, 2025. 13 pages.
Jamshaid et al. Mechanisms for centralized flow rate control in 802.11-based wireless mesh networks. Nov. 26, 2011. Computer Networks, vol. 56, No. 2 , pp. 884-901, DOI: 10.1016/J.COMNET.2011.11.009.
Result of Consultation for European Patent Application No. 23168586.8 dated Dec. 16, 2025. 7 pages.

(56) References Cited

OTHER PUBLICATIONS

Aleksandar Dragojevic, Dushyanth Narayanan, Orion Hodson, and Miguel Castro, "FaRM: Fast Remote Memory," In the Proceedings of the 14th USENIX Symposium on Networked Systems Design and Implementation (NSDI '14), pp. 401-414, Seattle, WA, USA, 2014. 15 pages.
Nandita Dukkipati and Nick McKeown, "Why Flow-Completion Time is the Right Metric for Congestion Control," ACM SIGCOMM Computer Communication Review, 36(1):59-62, 2006.
Daniel E. Eisenbud, Cheng Yi, Carlo Contavalli, Cody Smith, Roman Kononov, Eric Mann-Hielscher, Ardas Cilingiroglu, Bin Cheyney, Wentao Shang, and Jinnah Dylan Hosein, "Maglev: A Fast and Reliable Software Network Load Balancer," In the Proceedings of the 13th USENIX Symposium on Networked Systems Design and Implementation (NSDI '16), pp. 523-535, Santa Clara, CA, USA, 2016. 14 pages.
Vishal Fadia and Philip Wells, "Turbo boost your Compute Engine workloads with new 100 Gbps networking," [online]. Retrieved from the internet: <https://cloud:google:com/blog/products/networking/increasing-bandwidth-to-c2-andn2-vms>, 3 pages.
Peter X. Gao, Akshay Narayan, Sagar Karandikar, Joao Carreira, Sangjin Han, Rachit Agarwal, Sylvia Ratnasamy, and Scott Shenker, "Network Requirements for Resource Disaggregation," In the Proceedings of the 12th USENIX Symposium on Operating Systems Design and Implementation (OSDI '16), pp. 249-264, Savannah, GA, USA, 2016. 17 pages.
Prateesh Goyal, Preey Shah, Kevin Zhao, Georgios Nikolaidis, Mohammad Alizadeh, and Thomas E. Anderson, "Backpressure Flow Control," In the Proceedings of the 19th USENIX Symposium on Networked Systems Design and Implementation (NSDI '22), pp. 779-805, Renton, WA, USA, 2022. 28 pages.
Sangtae Ha, Injong Rhee, and Lisong Xu, "CUBIC: A New TCP-Friendly High-Speed TCP Variant," ACM SIGOPS Operating Systems Review, 42(5):64-74, 2008.
Christian Hopps, "Analysis of an Equal-Cost Multi-Path Algorithm," Technical report RFC 2992, The Internet Society, Nov. 2000. 8 pages.
Jaehyun Hwang, Qizhe Cai, Ao Tang, and Rachit Agarwal, "TCP » RDMA: CPU-efficient Remote Storage Access with i10," In the Proceedings of the 17th USENIX Symposium on Networked Systems Design and Implementation (NSDI '20), pp. 127-140, Santa Clara, CA, USA, 2020. 15 pages.
Van Jacobson, "Congestion Avoidance and Control," ACM SIGCOMM Computer Communication Review, 18 (4):314-329, 1988.
Abdul Kabbani, Balajee Vamanan, Jahangir Hasan, and Fabien Duchene, "FlowBender: Flow-level Adaptive Routing for Improved Latency and Throughput in Datacenter Networks," 10th International Conference on emerging Networking Experiments and Technologies (CoNEXT '14), pp. 149-159, Sydney, AU, 2014. 11 pages.
Dina Katabi, Mark Handley, and Charlie Rohrs, "Congestion Control for High Bandwidth-Delay Product Networks," In SIGCOMM '02: Proceedings of the 2002 conference on Applications, technologies, architectures, and protocols for computer communications, pp. 89-102, Aug. 2002. 14 pages.
Gautam Kumar, Nandita Dukkipati, Keon Jang, Hassan M.G. Wassel, Xian Wu, Behnam Montazeri, Yaogong Wang, Kevin Springborn, Christopher Alfeld, Michael Ryan, David Wetherall, and Amin Vahdat, "Swift: Delay is Simple and Effective for Congestion Control in the Datacenter," SIGCOMM '20, pp. 514-528, 2020. 15 pages.
J. Kumar, S. Anubolu, J. Lemon, R. Manur, H. Holbrook, A. Ghanwani, D. Cai, H. Ou, Y. Li, and X. Wang, "Inband Flow Analyzer," May 2021, Retrieved from the internet: <https://datatracker:ietf:org/doc/html/draftkumar-ippm-ifa>, 66 pages.
ChonLam Lao, Yanfang Le, Kshiteej Mahajan, Yixi Chen, Wenfei Wu, Aditya Akella, and Michael Swift, "ATP: In-network Aggregation for Multi-tenant Learning," In the Proceedings of the 18th USENIX Symposium on Networked Systems Design and Implementation (NSDI '21), pp. 741-761, 2021. 22 pages.
Jean-Yves Le Boudec, "Rate adaptation, Congestion Control and Fairness: A tutorial," Published on Research Gate, Jan. 2002. 45 pages.
Yuliang Li, Gautam Kumar, Hema Hariharan, Hassan Wassel, Peter Hochschild, Dave Platt, Simon Sabato, Minlan Yu, Nandita Dukkipati, Prashant Chandra, and Amin Vahdat, "Sundial: Fault-tolerant clock Synchronization for Datacenters," In the Proceedings of the 14th USENIX Symposium on Operating Systems Design and Implementation (OSDI '20), pp. 1171-1186, 2020. 17 pages.
Yuliang Li, Rui Miao, Hongqiang Harry Liu, Yan Zhuang, Fei Feng, Lingbo Tang, Zheng Cao, Ming Zhang, Frank Kelly, Mohammad Alizadeh, and Minlan Yu, "HPCC: High Precision Congestion Control," In Proceedings of the ACM Special Interest Group on Data Communication (SIGCOMM '19), pp. 44-58, Beijing, CN, Aug. 2019. 15 pages.
Parveen Patel, Deepak Bansal, Lihua Yuan, Ashwin Murthy, Albert Greenberg, David A. Maltz, Randy Kern, Hemant Kumar, Marios Zikos, Hongyu Wu, Changhoon Kim, and Naveen Karri, "Ananta: Cloud Scale Load Balancing," In Proceedings of the ACM SIGCOMM 2013 conference on SIGCOMM (SIGCOMM '13), pp. 207-218, New York, NY, USA, 2013. 12 pages.
Amedeo Sapio, Marco Canini, Chen-Yu Ho, Jacob Nelson, Panos Kalnis, Changhoon Kim, Arvind Krishnamurthy, Masoud Moshref, Dan Ports, and Peter Richtarik, "Scaling Distributed Machine Leaming with In-Network Aggregation," In the Proceedings of the 18th USENIX Symposium on Networked Systems Design and Implementation (NSDI '21), pp. 785-808, 2021. 25 pages.
Office Action for Chinese Patent Application No. 202310410579.8 Apr. 1, 2026. 8 pages.
Notice of Grant for Chinese Patent Application No. 202310410579.8 dated Aug. 28, 2026. 4 pages.

* cited by examiner

100

200

300

400

500

600

700

800

900

1000

CONGESTION CONTROL FOR NETWORKS USING DEPLOYABLE INT

CROSS-REFERENCE TO RELATED APPLICATIONS

The present application claims the benefit of the filing date of U.S. Provisional Patent Application No. 63/332,421, filed on Apr. 19, 2022, the disclosure of which is hereby incorporated herein by reference.

BACKGROUND

Controlling network congestion is important to network performance, which in turn is important to satisfying demand and meeting customer satisfaction. Congestion control (CC) provides a mechanism that, in general, controls the entry of data, e.g., data packets, into a network. The importance of CC is increasing as applications increasingly demand low-latency operations on a datacenter scale. Examples of such applications include memory and storage disaggregation, machine learning (ML), and large scale incast. Congestion control is becoming more challenging, in part because link bandwidths are growing faster than buffers at switches, and high throughput packet servers benefit from simple CC algorithms offloaded to network interface cards (NICs) to save CPU for applications. Effective datacenter CC should provide one or more of high throughput, low latency, fairness, and relatively fast convergence across varied workloads.

A challenge faced by congestion control protocols is gaining more granular visibility into the fine-timescale hop-level congestion state of a network. Datacenter CC algorithms typically rely on either end-to-end signals (e.g., delay) or quantized in-network feedback (e.g., explicit congestion notification (ECN)). These signals include information or signals that are aggregated end-to-end across all hops on a flow's path. These CC algorithms often observe under-utilization, slow ramp-up, and/or unfairness.

SUMMARY

An aspect of the disclosed technology is a computing system that implements a congestion control protocol that exploits and extends in-network telemetry (INT) to address, for example, blind spots typically found in end-to-end algorithms; determines CC for an actual bottleneck hop; realizes low queuing delay; and/or realizes convergence to network-wide max-min fair bandwidth allocation.

For example, an aspect of the disclosed technology is a method for network congestion control, comprising: detecting maximum hop delays at each hop along a path between a network source node and a network destination node; determining, at a host machine associated with a hop along the path between the network source node and the network destination node, a maximum hop delay value from among the maximum hop delays detected at each hop, the maximum hop delay value being associated with a bottleneck hop along the path between the network source node and the network destination node; and effecting congestion control, at the host machine, based on the maximum hop delay value associated with the bottleneck hop.

In accordance with this aspect of the disclosed technology, the method may comprise comprising inserting, by respective in-network telemetry (INT) devices located at each hop along the path between the network source node and the network destination node, the maximum hop delay for each hop in a packet header of a respective message sent from each hop.

In accordance with the foregoing aspects of the disclosed technology, inserting comprises inserting by an INT-enabled switch or an INT-enabled network interface card (NIC). Further, the host machine may be located at a source hop associated with the network source node.

In accordance with the foregoing aspects of the disclosed technology, the bottleneck hop comprises a congested hop that limits data packet flows that transmit more than their max-min fair-share rate. Further, effecting congestion control may comprise decreasing a transmission rate of only those data packet flows that transmit more than their max-min fair-share rate. In addition, effecting congestion control may comprise comparing the maximum hop delay value detected at each hop to a rate-adjusted target hop delay associated with each respective hop. Further, the method may comprise updating a congestion window update function at the host machine based on the comparison. Further still, updating may comprise decreasing the congestion window only if the data packet flow got the max-min fair-share rate on congested hops along the path between the network source node and the network destination node.

In another example, an aspect of the disclosed invention may comprise a system. The system comprises a source node; a destination node; one or more hops along a data path between the source node and the destination node; and a host machine coupled to the source node, the host machine comprising one or more memories storing instructions that cause one or more processing devices to: detect maximum hop delays at each hop along the data path between the source node and the destination node; determine a maximum hop delay value from among the maximum hop delays detected at each hop, the maximum hop delay value being associated with a bottleneck hop along the data path; and effect congestion control based on the maximum hop delay value associated with the bottleneck hop.

In accordance with this aspect of the disclosure, the instructions may cause the one or more processing devices to insert, by respective in-network telemetry (INT) devices located at each hop along the data path, the maximum hop delay for each hop in a packet header of a respective message sent from each hop. Further, the INT devices may comprise one of an INT-enabled switch or an INT-enabled network interface card (NIC). In addition, the host machine is located at the source node.

In accordance with the foregoing aspects of the disclosure, the bottleneck hop may comprise a congested hop that limits data packet flows that transmit more than their max-min fair-share rate. Further, to effect congestion control may comprise decreasing a transmission rate of only those data packet flows that transmit more than their max-min fair-share rate. Further still, to effect congestion control may comprise comparing the maximum hop delay value detected at each hop to a rate-adjusted target hop delay associated with each respective hop.

In accordance with the foregoing aspects of the disclosure, the instructions may cause the one or more processing devices to update a congestion window at the host machine based on the comparison. Further, to update may comprise decreasing the congestion window only if the data packet flow got the max-min fair-share rate on congested hops along the path between the network source node and the network destination node.

DETAILED DESCRIPTION

The disclosed technology includes a technique for implementing congestion control in packet-based networks. The technique may be embodied in a process or method, as well as a system. The technique leverages INT technology to enable packet-based systems to segment congestion control such that the congestion control mechanism may react only to congestion at the bottleneck hop but not every congested hop. In effect, the disclosed technology may address blind spots in end-to-end algorithms.

In addition, under steady state conditions, the technique realizes network-wide maximum-minimum fair share bandwidth allocation (e.g., a state where no flow can increase its rate by decreasing the rate of faster flows). Furthermore, the technique decouples the bandwidth fairness requirement from the Additive Increase/Multiplicative Decrease (AIMD) algorithm, making it possible for the technique to converge fast and smooth out bandwidth oscillations. For instance, the technique can achieve fairness on a single hop with selection of the appropriate increase/decrease functions. Further, the technique allows for incremental deployment in Brownfield-type environments that mix INT and non-INT devices.

The technique includes making use of INT technology by including parameter or metadata fields in INT packets that collect and report the maximum or largest maximum hop delay or latency along the data path between the source and the destination nodes. This information is returned to the source node where it is used to control congestion. In this regard, congestion may be controlled in a manner such that flows that have yet to reach their fair share of bandwidth do not get penalized as a result of the detected congestion.

The technique may be applied within a data center using switches (or routers) within the data center. It may also be applied across data centers. In general, the technique may be applied where an entity has control over both ends of the switches or routers.

Figure 1:
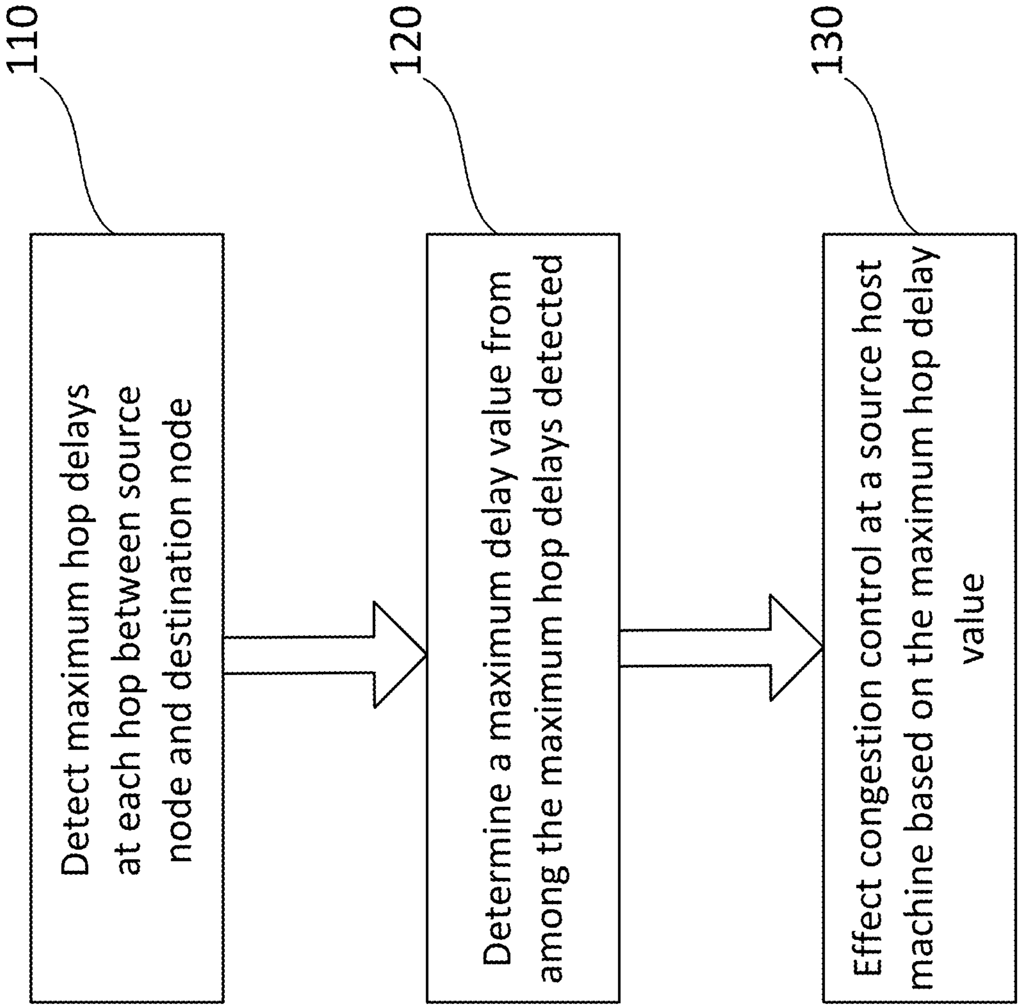
FIG. 1 illustratively depicts a method or process in accordance with an aspect of the disclosure.

FIG. 1 illustratively depicts a method or process 100 in accordance with an aspect of the disclosure. The method 100 includes a step 110 of detecting the maximum hop delays at each hop between a source node and a destination node on a network data path. In general, the source node and destination node form, respectively, origination and termination points for data sent from the source node. In traversing between the source and destination nodes, a data packet may encounter multiple hops. In general, each time a packet of data moves from one device (e.g., a router or switch) to another device, each device that encounters the movement may be considered a hop point or hop. In some instances, a hop may be considered switches or routers within a datacenter. In such instances, network interface cards (NICs) operate to send the packets within the datacenter. In other instances, a hop may be considered a data center in a cloud computing environment. More generally, the techniques discussed herein may be applied anywhere an entity has control on both ends (e.g., control of the switches along the path) so that it can enable INT or obtain reflecting INT information. As a data packet encounters a hop, it may experience a certain amount of time delay due to the time it resides in queue for processing and/or the time that it is actually processed. At step 110, each hop in the network path associated with the data packet detects or measures the maximum hop delay associated with the hop.

At step 120, a host machine determines the maximum hop delay along the data path between the source and destination nodes. In this regard, note that the source and destination nodes may be considered hops in the data path. The maximum hop delay may be determined, for example, using a maximum hop delay value that is provided via a return data path to the source node. For instance, a switch at each hop may insert the maximum hop delay or latency experienced by a packet. This may include locally storing a maximum hop delay value received from an upstream node, comparing that value with a maximum hop delay value for the current hop at which the switch is located, and inserting the larger maximum hop delay value of the two, along with information identifying the hop associated with larger delay. In this way, the maximum hop delay value that is returned to the source will be the largest maximum hop delay value experienced by a data packet along the data path.

Figure 7:
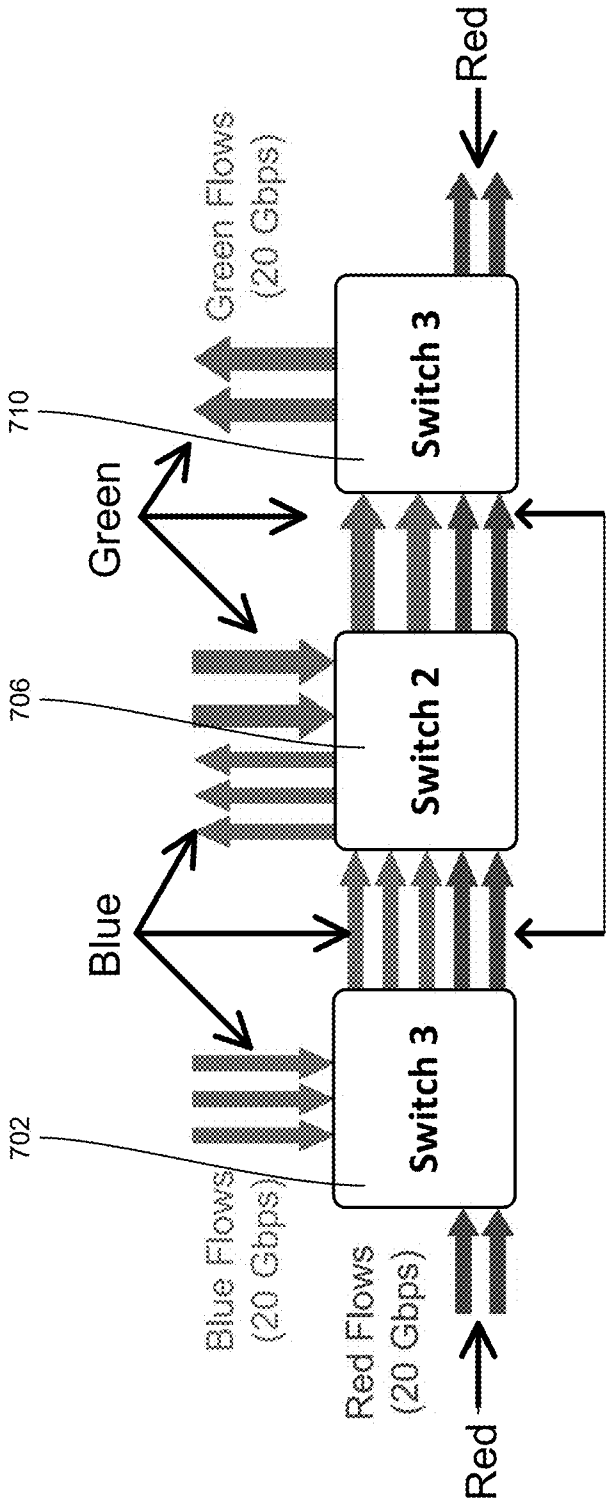
FIG. 7 illustratively depicts a system in accordance with an aspect of the disclosure.

At step 130, the host machine effects congestion control based on the maximum hop delay value received at the source. The maximum hop delay's value is to identify a bottleneck hop such that congestion control is effected based on the congestion state of the bottleneck hop. As is further explained below, the process or method 100 may be implemented without learning the congestion state of every hop of a flow (e.g., packets or data sent between a source and destination). As such, the bottleneck hop may be considered the hop that limits the rate of the flow as per max-min fair allocation parameters. In this regard, a congested hop is not considered the bottleneck hop for all flows passing through the congested hop, but only for flows that send more than their max-min fair-share rate, and thus, CC should ideally increase the rate of only those flows that are above their fair-share. In general, fair-share rate refers to fair-share of bandwidth. In this regard, rate generally refers to bandwidth. For example, if we assume there is one link in the network with 100 Gigabyte (100G) speed and 5 flows going through that link, fair-share allocation should give each flow 20 Gigabytes. The concept of max-min fair-share generally refers to maximizing the flow that is minimum. As an example, this may result in redistributing bandwidth to flows with lower bandwidth demand (poorer flows) from flows with higher bandwidth demands until the lower bandwidth flow experiences some other bandwidth. FIG. 7 provides an example system 700 illustrating how this concept may apply. In FIG. 7, links are 100G and there is one link between switches 1 (702) and 2 (706) and another link between switches 2 (706) and 3 (710). The red and blue flows are the poorest flows, but the performance of the red flows cannot be helped by giving them more bandwidth at the switch 2 (706) to 3 (710) link (by taking from greens), because they are bottlenecked at switch 1 (702) to 2 (706). Switch 1 to 2 is already fair, we have 100G and 5 flows, each flow got 20G. As such, given fair allocation at each hop, max-min network-wide allocation is attained or at least attainable.

Figure 2:
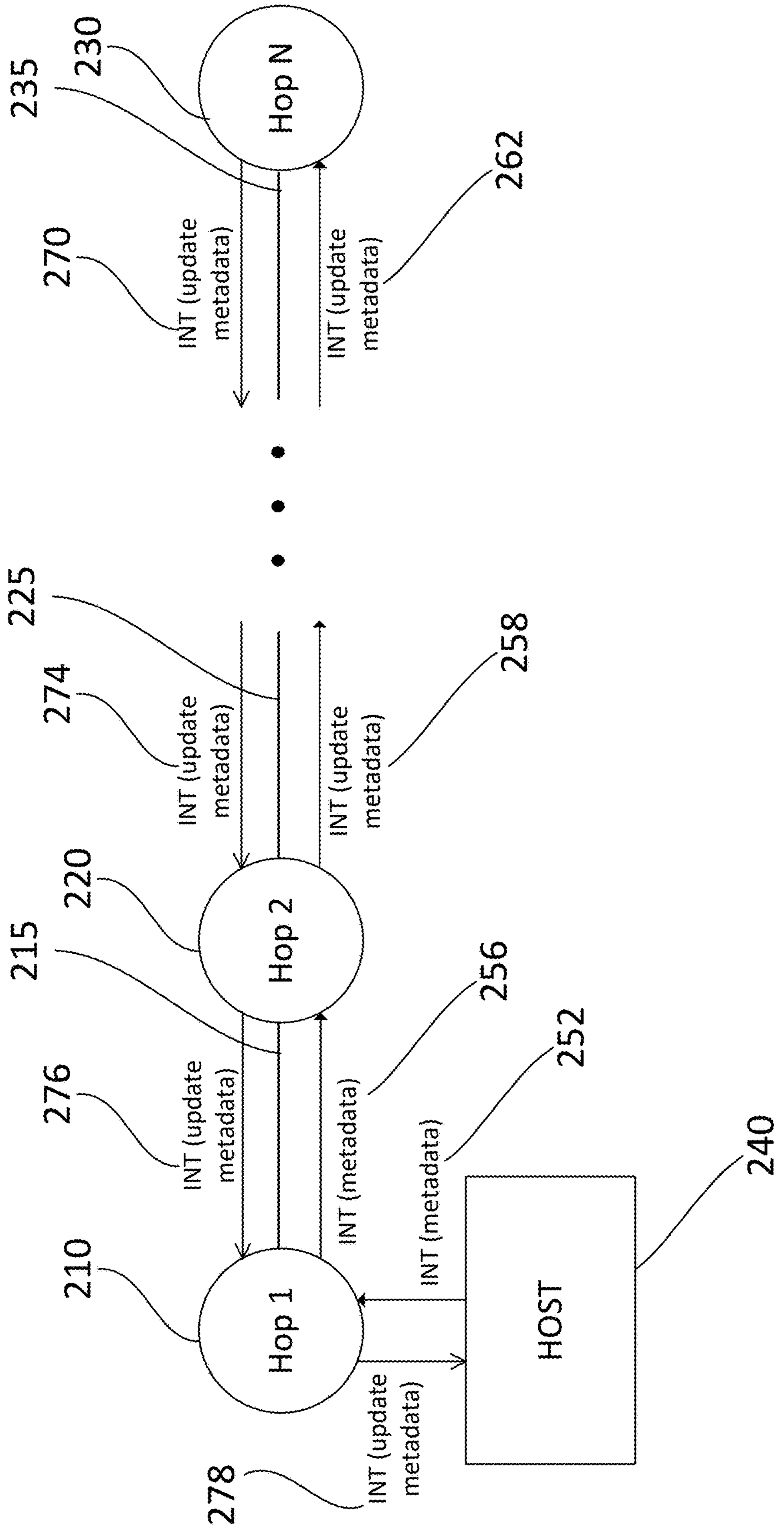
FIG. 2 illustratively depicts method or process associated with a network in accordance with an aspect of the disclosure.

FIG. 2 illustratively depicts a method or process associated with a network 200 in accordance with an aspect of the disclosure. With respect to FIG. 2, Hop 1 may be considered a source node 210, Hop 2 an intermediate node 220, and Hop N a destination node 230. N may comprise any integer depending on the number of additional hops between Hop 2 and Hop N. For example, if N is 5, then two additional hops will exist between Hop 2 and Hop 5 as the destination node. Hop 1 210 and Hop 2 220 are coupled via data link 215. Hop 2 is connected to a data link 225 and Hop N to a data link 235. In some examples, a hop comprises a switch or router in a data center or may comprise a data center. As indicated, Hop 1 or source node 210 is coupled to a host device or machine 240. Host 240 generally comprises a processing device with associated memory and instructions that function to effect congestion control at a hop that serves as source node. Other hops shown in network 200 will typically also be associated with a host device, and, in the case where a hop is a data center, their own host device.

As shown, host 240 generates a packet 252 in accordance with the in-network telemetry (INT) mechanism, which provides a framework for collecting and reporting network state via the data plane. For instance, in an aspect of the technology disclosed herein, INT may be leveraged to include a max_hop_latency metadata or parameter that is collected and reported on at one or more or all hops in a network. The max_hop_latency metadata or parameter may comprise the latency associated with a hop. Generally, hop latency is the time from when a packet reaches the input of a device (e.g., switch or router) to time when it egresses from the device. It may be thought of as the time a packet, e.g., an INT packet, takes to be switched or processed within a hop. Switches, for example, need to process the packet to know where it should go. Usually switches have many ports and based on a tag (e.g., destination IP) and a routing table, they know where the packet should go. In this regard, the bulk of the delay in switches is queueing. For example, suppose that traffic from 2 ports on a switch want to go to 1 port for a short period of time. Those packets therefore have to form a queue and gradually go into the target port. This delay can be up to hundreds of microseconds. If this congestion continues, the queue build up may exceed the buffer capacity in the switch, resulting in dropped packets. The host has to detect such drops by noticing that an acknowledgement message didn't come from the destination. It is the role of congestion control to avoid such scenarios.

As host 240 resides at the source node 210, the source node transmits the INT packet 256 to Hop 2 (or node 2) 220. Hop 2 then updates the max_hop_latency metadata or parameter to include the maximum latency hop value associated with Hop 2. For instance, the source node may set the max_hop_latency metadata or parameter to 0 initially, such that Hop 2 would then replace the value of 0 with the maximum latency hop value determined at Hop 2. Hop 2 then transmits the max_hop_latency metadata or parameter value in INT packet 258, along with a queue.latency metadata or parameter to the next hop, e.g., Hop 3 not shown, in the network. The queue.latency metadata or parameter provides a measure of the amount of time a hop holds a data packet in queue between ingress and egress. If at the next hop, e.g., Hop 3, the max_hop_latency metadata or parameter value is larger than that at Hop 2, the max_hop_latency metadata or parameter and queue.latency metadata or parameter are replaced with the values for Hop 3. The process then continues such that when INT packet 262 arrives at Hop N 230 (the destination node), it contains the value of the hop with the maximum max_hop_latency metadata or parameter, as well as the queue.latency metadata or parameter value for that hop.

Upon receiving the maximum max_hop_latency metadata or parameter and the queue.latency metadata or parameter, Hop 230 (or destination node) generates an INT packet 270, and transmits the maximum max_hop_latency metadata or parameter and queue.latency metadata or parameter value for the hop with maximum value back the source node 210 (or Hop 1) through intervening Hops N-1 through Hop 2. This is illustrated via INT packets 274 and 276. When the INT packet arrives at source 210, the INT metadata/parameters that were collected are reported to host 240 via a packet, for example, 278.

Figure 3:
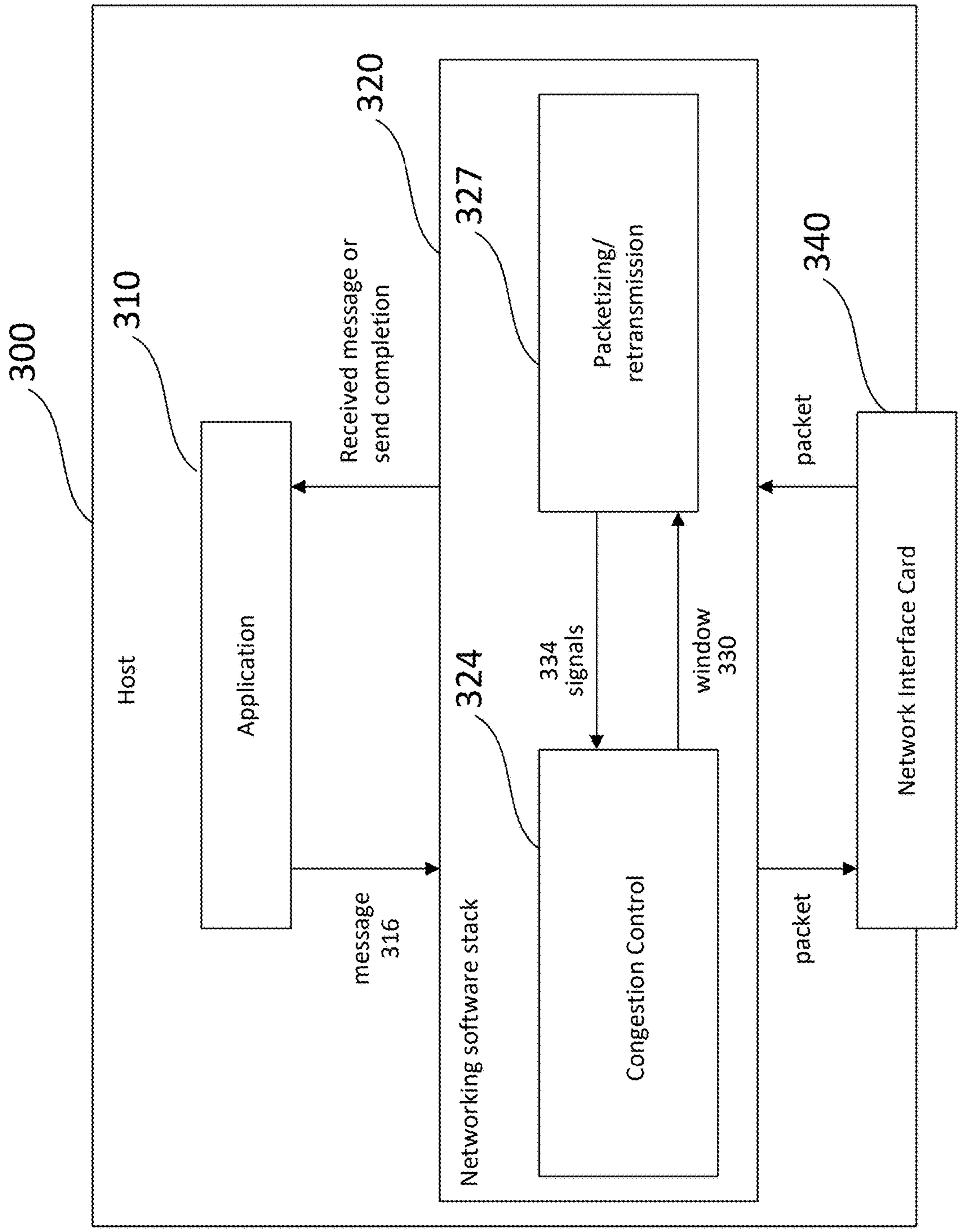
FIG. 3 illustratively depicts a host machine in accordance with an aspect of the disclosure.

Turning now to FIG. 3, there is depicted a host 300 in accordance with an aspect of the disclosure. Host 300 may comprise host 240 in FIG. 2. Host 300 includes an application 310 operating at an application layer in the host. Application 310 may generate one or more messages 316 that are provided to a networking software stack 320. Network software stack 320 includes congestion control function 324 and packetizing/retransmission function 327. Congestion control function 324 determines and transmits a congestion window signal or parameter 330 to packetizing/retransmission function 327. Packetizing/retransmission function 327 transmits a signal 334 to congestion control function 324. Congestion window 330 comprises a signal or parameter that specifies the maximum number of packets that can be sent to a receiver or destination node without receiving an acknowledgement. The signal 334 comprises a signal or parameter that informs the congestion control function 324 when the receiver or destination acknowledges receipt of a transmitted data packet. Signal 334 also includes signals or information about congestion on the path. Essentially, signal 334 coveys the max-hop latency to the CC at the source. Host 300 also includes a network interface card 340 that receives packets from the network software stack 320 and transmits packets it receives from the network to network software stack 320.

The CC function 324 (which we refer to as Poseidon) effects congestion control in response to data flow (or flow) at a bottleneck hop. As mentioned above, the bottleneck hop may be considered the hop that limits the rate of the flow as per max-min fair allocation parameters. In this regard, a congested hop is not considered the bottleneck hop for all flows passing through the congested hop, but only for flows that send more than their max-min fair-share rate, and thus, CC should ideally increase the rate of only those flows that are above their fair-share. In other words, the CC function 324 reacts to the bottleneck hop by decreasing the congestion window only if the flow got the fair-share on congested hops over its path. Generally, the CC function 324 adjusts the rate of each flow using a congestion window, and if the window goes below a value of 1, the CC function uses pacing (e.g., when the congestion window is less than 1). The CC function 324 compares a delay signal with a target to increase or decrease the congestion window. More specifically, CC function 324 (1) applies the target to maximum per-hop delay (MPD) to allow flows to react to the most congested hop and (2) adjusts the target based on the throughput of the flow to make sure only the flows that get the highest rate on the hop reduce their congestion window.

The disclosed technology achieves high link utilization, low queuing delay, and network-wide max-min fairness, with a fast convergence and stable per-flow throughput. The disclosed technology, e.g., Poseidon, may be configured so that it only reacts to the bottleneck hop by decreasing the congestion window only if the flow got the fair-share on congested hops over its path. This can be accomplished, as discussed herein, without knowing the fair-share. Poseidon compares a delay signal with the target to increase or decrease the window. The delay signal and target can be defined as follows:

1. It applies the target to the maximum per-hop delay to allow flows to react to the most congested hop.
2. It adjusts the target based on the throughput of the flow to make sure only the flows that get the highest rate on the hop reduce their window.

More specifically, every flow tries to maintain the maximum per-hop delay (MPD) close to a maximum per-hop delay target (MPT), namely, increase the congestion window when MPD MPT to keep the link busy and decrease the window when MPD>MPT to limit the congestion. MPD adds small and fixed overhead to packets and is one of the important designs to find the bottleneck hop. In the max-min fair state, the hop with maximum latency is the bottleneck hop of the flow for Poseidon; otherwise, the flow has not reached its fair-share along its path. The former case must decrease the congestion window, and the latter must ignore the congestion and increase the window. This may be achieved by adjusting the target.

Figure 8:
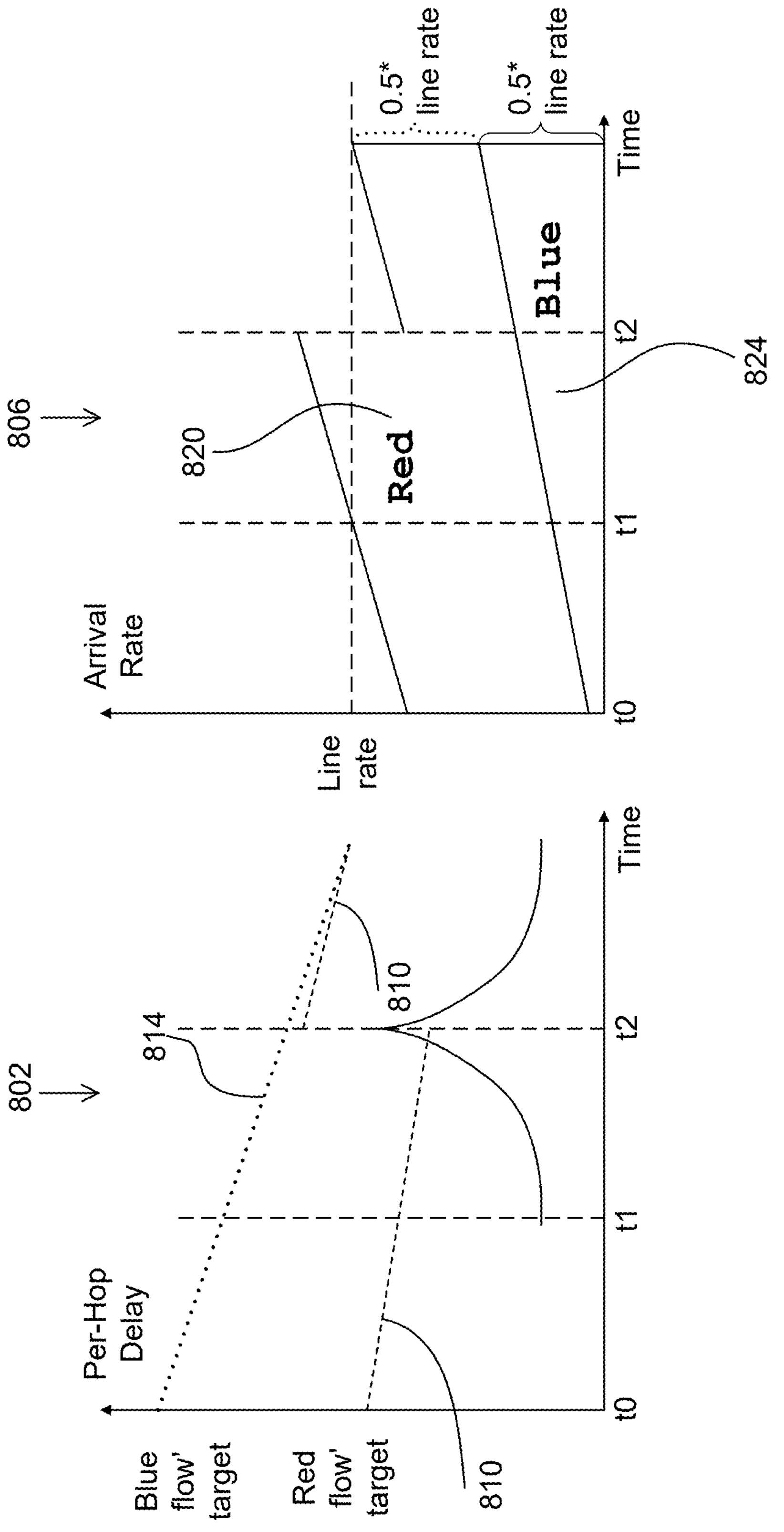
FIG. 8 illustratively depicts a relationship between delay and arrival rate.

CC function 324 calculates the maximum per-hop delay target (MPT) for each flow based on its rate: the larger the rate is, the smaller MPT will be. This means that flows with higher rates have lower targets, thus they decrease their window earlier or more aggressively. This became possible using INT, as now all flows competing in the same queue tend to observe the same congestion signal (per-hop delay). FIG. 8 shows an example plots of per-hop delay (802) and arrival rate (806) versus time. In accordance with FIG. 8, lines 810 and 814 identify, respectively, to the red target flow and the blue target flow on the per-hp delay plot 802. as the arrival rate on the link goes over the line rate at time t1, a queue builds up. The queuing delay grows over the target of faster flow, red area 820 on plot 806, and forces it to reduce its window at t2. However, the slower flow, blue area 824 on plot 806, can still increase its window. Interestingly, this means that given the same congestion signal from the network, some flows increase and some decrease their rate.

In accordance with the disclosed technology, fairness may be achieved on a single hop. Because the disclosed technology makes use of rate-adjusted target delay and delay-based increase/decrease functionality, in some cases faster flows will decrease their rate while slower flows will increase their rate. This may occur if the queuing delay is higher than the faster flow's target, but lower than the slower flow's target. In accordance with the disclosed technology, fairness improves in all possible cases:

1. MPD is low, and all flows increase their rate.
2. MPD is high, and all flows decrease their rate.
3. MPD is high, some faster flows decrease their rate, while other slower flows increase their rate.

Assume a queue with two flows, A and B, where b, the rate of B is larger than a, the rate of A (b>a). As a result, the target of A is larger than the target of B (T(a)>T(b)). We define an update function U(T(rate);delay) as the multiplicative factor (where new_cwnd=cwnd_U(( ) with a specific flow rate and network delay. In order to converge to the line rate, U( ) is set≥1 if delay is less than the target and ≤1 if delay is more than the target, assuming, on average, if arrival rate<line rate, delay is low, and if arrival rate>line rate, delay increases.

$$U(T(\text{rate}), \text{delay}) = \begin{cases} \geq 1, & \text{delay} \leq T(\text{rate}) \\ < 1, & \text{delay} > T(\text{rate}) \end{cases} \tag{1}$$

Figure 9:
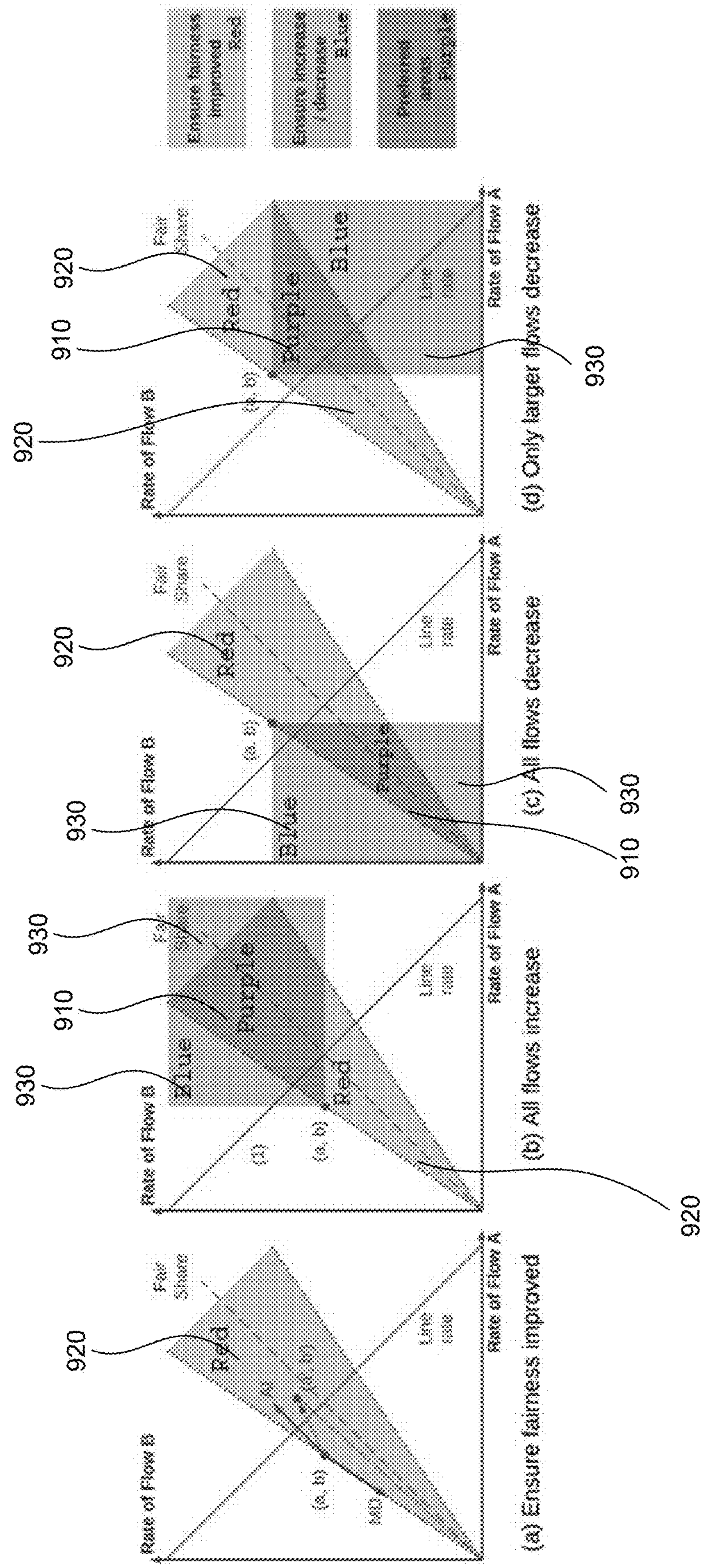
FIG. 9 illustratively depicts a relationship between rates and fair-share.

In all three cases, if we want to guarantee that the fairness improves or at least stays the same, the updated rates should stay in the red triangle shown in FIG. 9. One side of the triangle is defined by the current ratio of rates, and the other side is symmetric across the fair-share line. If we assume a<b and the delay is D, this requirement can be written as:

$$\frac{a}{b} < \frac{b \cdot U(T(b), D)}{a \cdot U(T(a), D)} < \frac{b}{a}, \forall a < b, \forall D > 0 \tag{2}$$

$$\frac{a^2}{b^2} < \frac{U(T(b), D)}{U(T(a), D)} < 1, \forall a < b, \forall D > 0$$

The disclosed technology achieves high link utilization and fairness if the functions T( ) and U( ) satisfy Eq. (1) and Eq. (2). FIG. 9 illustratively depicts illustrates Eq. (1), updates that allow full link utilization, in blue color and Eq. (2), updates that converge toward fairness, in red. The desirable overlapped area is marked in purple. In accordance with the disclosed technology, the rate (in the purple area 910) is updated such that it increases fairness (in the red area 920) toward the line rate (blue area 930). Additive increase will be in parallel to the fair-share line, and multiplicative increase/decrease with the same ratio stays on the same edge of the red triangle where the node (a;b) is (FIG. 9(*a*)). For case 1 in FIG. 9(*b*), the red area ensures the fairness is improved, and the blue area ensures all flows increase their rates; for case 2 in FIG. 9(*c*), the blue area ensures all flows decrease their rates; for case 3 in FIG. 9(*d*), the blue area ensures the slower flow increases its rate while the faster flow decreases its rate.

In accordance with the disclosed technology, any function that satisfies Eqs. (1) and (2) may be used. In accordance with an aspect of the disclosed technology, the following functions are designed to leverage the distance between the target and max-hop delay to not only decide whether to increase or decrease, but to also adjust the update ratio adaptively to reach a better trade-off between stability and fast convergence.

$$T(\text{rate}) = p \cdot \frac{\ln(\text{max\_rate}) - \ln(\text{rate})}{\ln(\text{max\_rate}) - \ln(\text{min\_rate})} + k \tag{3}$$

$$\text{min\_rate} < \text{rate} < \text{max\_rate},\ p > 0,\ k < 0$$

$$U(\text{rate}, \text{delay}) = \exp\left[\frac{T(\text{rate}) - \text{delay}}{p} \cdot \alpha \cdot m\right] \tag{4}$$

$$\text{where } \alpha = \ln(\text{max\_rate}) - \ln(\text{min\_rate})$$

rate is cwnd*MTU=RTT. k defines the minimum target for any flow; p tunes the maximum target when the rate is equal to min_rate and decides how far apart the target of two flows with close rates can be. In practice, the target cannot be lower than a limit without decreasing the throughput because synchronized arrivals can cause premature window decrease. The target cannot be very large, too, because a) it can cause packet drops in switches when the target delay exceeds the queue capacity; b) as long as we achieve high utilization, we prefer to back-pressure to hosts so that they leverage other mechanisms such as load-balancing and admission control for isolation. We use min_range and max_range to not waste the target range for differentiating rates that only happen rarely. m defines the "step" when updating the rate. The larger m is, the slower the rate of update will be.

Figure 10:
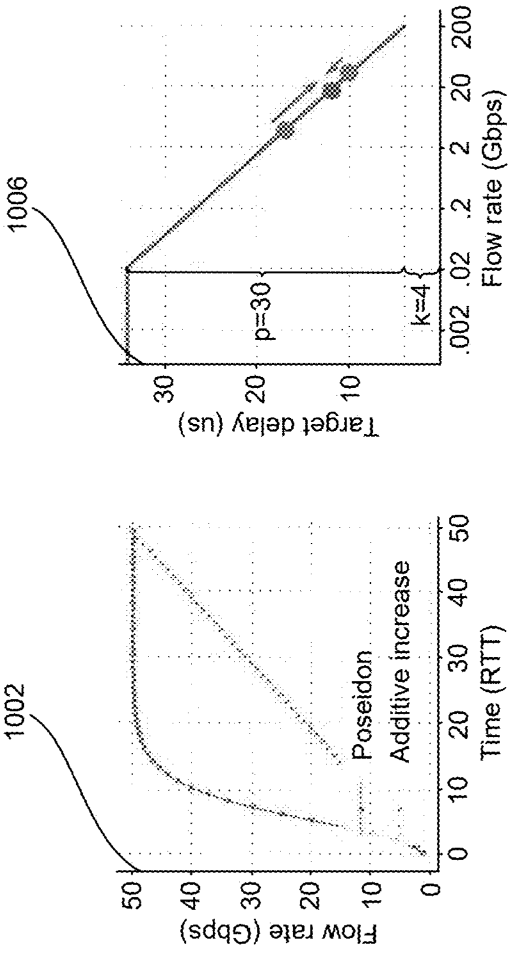
FIG. 10 illustrates an example of how flow rate can increase to reach the 100G.

When $|T(\text{rate})-\text{delay}|\to 0$, then $U(\text{rate};\text{delay})\to 1$. This means when the delay is far away from the target, flows increase/decrease more drastically for faster convergence, and when the delay approaches the target delay, the steps will be more gentle to achieve stable flow rates. FIG. 10 shows how the flow can quickly increase its rate to reach 100G using the adaptive solution.

Another option for T(rate) that satisfies the requirements is $$T(\text{rate}) = \frac{\alpha}{\sqrt{\text{rate}}} + \beta$$

which is an extension of Swift flow-scaling. In the disclosed technology, Eq. (3) was designed so as to provide a meaningful difference between the target of flows over all rates. That is, the target of a flow with rates a and c·a have a fixed difference $T(a)-T(c\cdot a)=\ln(c)/p$, providing uniform resolution across all ranges of rates (plot 1006).

Swift uses $1/\sqrt{cwnd}$ for flow scaling that addresses synchronized packet arrivals because it provides higher resolution for small windows where many flows send packets. Similarly, an option for the update function is to use the ratio of target over delay, similar to Swift.

As mentioned above, if the congestion window falls below 1, pacing is used by CC 324. In this regard, the congestion window (cwnd) is the number of packets that can be outstanding on the wire (sent but not acknowledged by remote). Now suppose that cwnd is 1. This would mean sending one packet, when that packet is acknowledged as received, the next packet is sent. When cwnd<1, e.g., 0.5, a source cannot send half of a packet each time. What is done is based on the time it took to send the last packet. For example, let's say it took 100 microseconds to send a packet and receive the acknowledgement. In order to simulate sending half a packet each 100 microseconds, we send a packet every 200 microseconds. This is implemented by holding a packet for 100 microseconds, then sending it, it takes another 100 microseconds to get the acknowledgement, then we hold the next for 100 microseconds and so on. The concept of pacing as used within may be employed as is done using the Swift algorithm.

Figure 4:
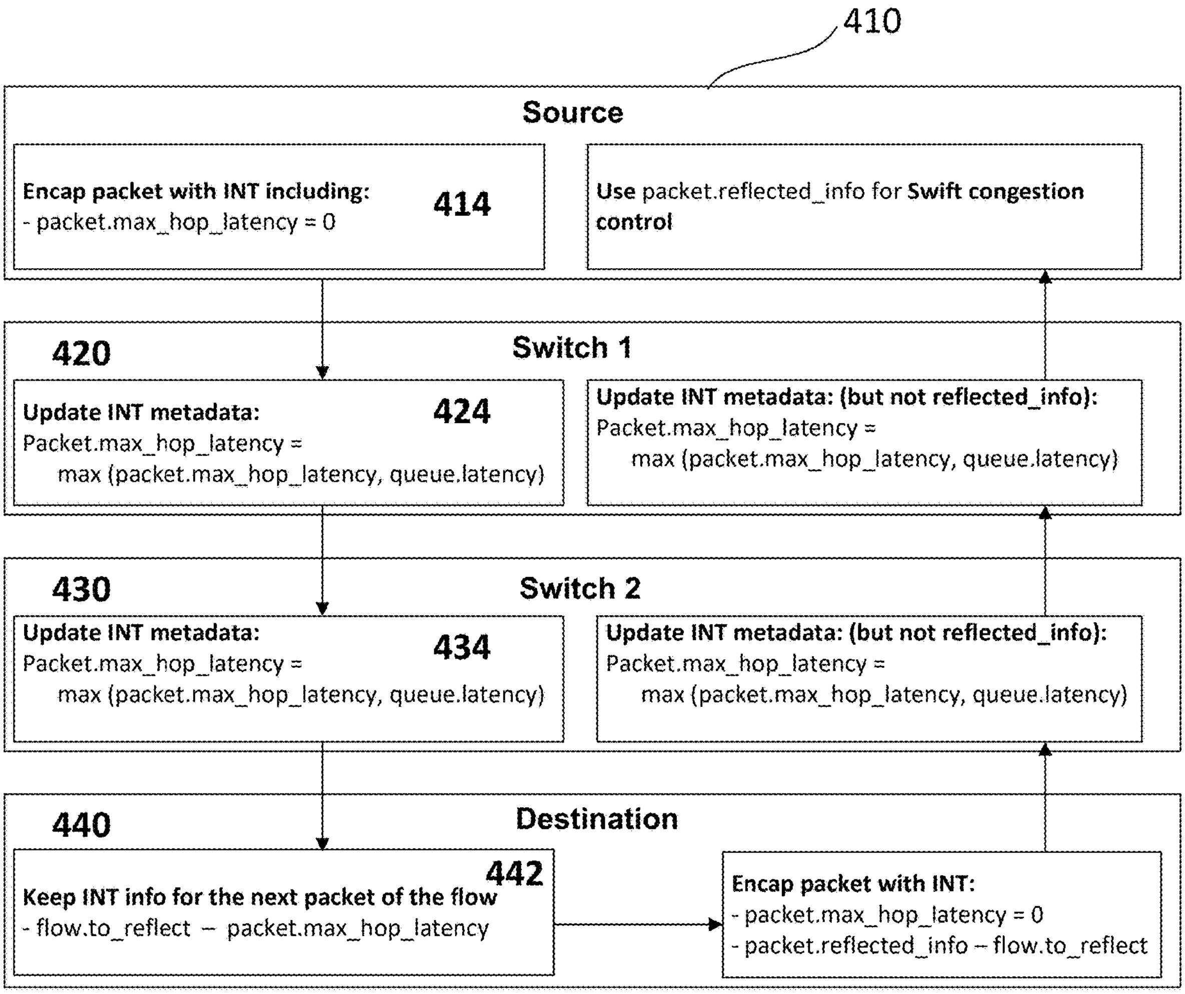
FIG. 4 illustratively depicts a process or method associated with devices in a source to destination packet data flow in accordance with an aspect of the disclosure.

FIG. 4 illustratively depicts a process or method 400 associated with devices in a source-to-destination data flow in accordance with an aspect of the disclosure. As shown, source 410 includes block 414 at which packets are encapsulated in accordance with the INT mechanism. For instance, block 414 indicates that a packet at source 410 includes a packet.max_hop_latency function that sets a packet.max_hop_latency metadata or parameter to a 0 value. The packet generated at source 410 is transmitted to a first hop that includes a first switch or Switch 1 420. Switch 1 420 may reside in Hop 2 220 of FIG. 2. Switch 1 420 (as well as the other switches depicted in FIG. 4) may comprise a top-of-rack switch in a data center. Switch 1 420 also implements the packet.max_hop_latency function 424, which provides a max (packet.max_hop_latency, queue.latency) value detected at the hop associated with Switch 1 420. That value is then transmitted to another hop, e.g., Hop 3 of FIG. 2, where a switch 430 uses the packet.max_hop_latency function 434 to update the max (packet.max_hop_latency, queue.latency) value based on whether the value detected at Hop 3 is larger than values detected at previous hops. Assuming that the next hop in the data flow path is the destination hop 440, e.g., the destination node Hop N of FIG. 2, a host at the destination node maintains the INT metadata parameter or values it receives for the next packet in the flow as depicted at block 442. In addition, block 430 provides the max (packet.max_hop_latency, queue.latency) value detected for packets transmitted from the source 410 to packetizing/transmission function at the destination node so that maximum value can be transmitted back to the source 410, via switches 1 and 2. The max (packet.max_hop_latency, queue.latency) is then used by the CC block by the host at the source as described previously.

As indicated in FIG. 4, there are two parameter or metadata fields: packet.max_hop_latency and packet.reflected_info. These two fields may be used as follows. Let's suppose a packet goes from source to destination and now the max_hop latency is 100 microseconds. Now the destination should acknowledge ("ack") receipt of such packet to the sender. The destination usually waits a little to see if it wants to send anything to the source and thus piggyback the acknowledgement on the data or not. Otherwise, a pure ack is sent. With respect to the disclosure, when the destination creates a packet to send to the source, it sets reflected_info to 100. This packet may have its own data (e.g., destination is actually source), and thus it sets max_hop_latency=0. During the journey of this packet back to the source, switches should not touch the reflected_info=100. Because the source congestion control should only get the signal about the congestion on the forward path, not the reverse path (where it has no control on). As such, the references to update INT metadata but not the reflected_info (switches on the reverse path don't touch it) embodies this concept.

Figure 5:
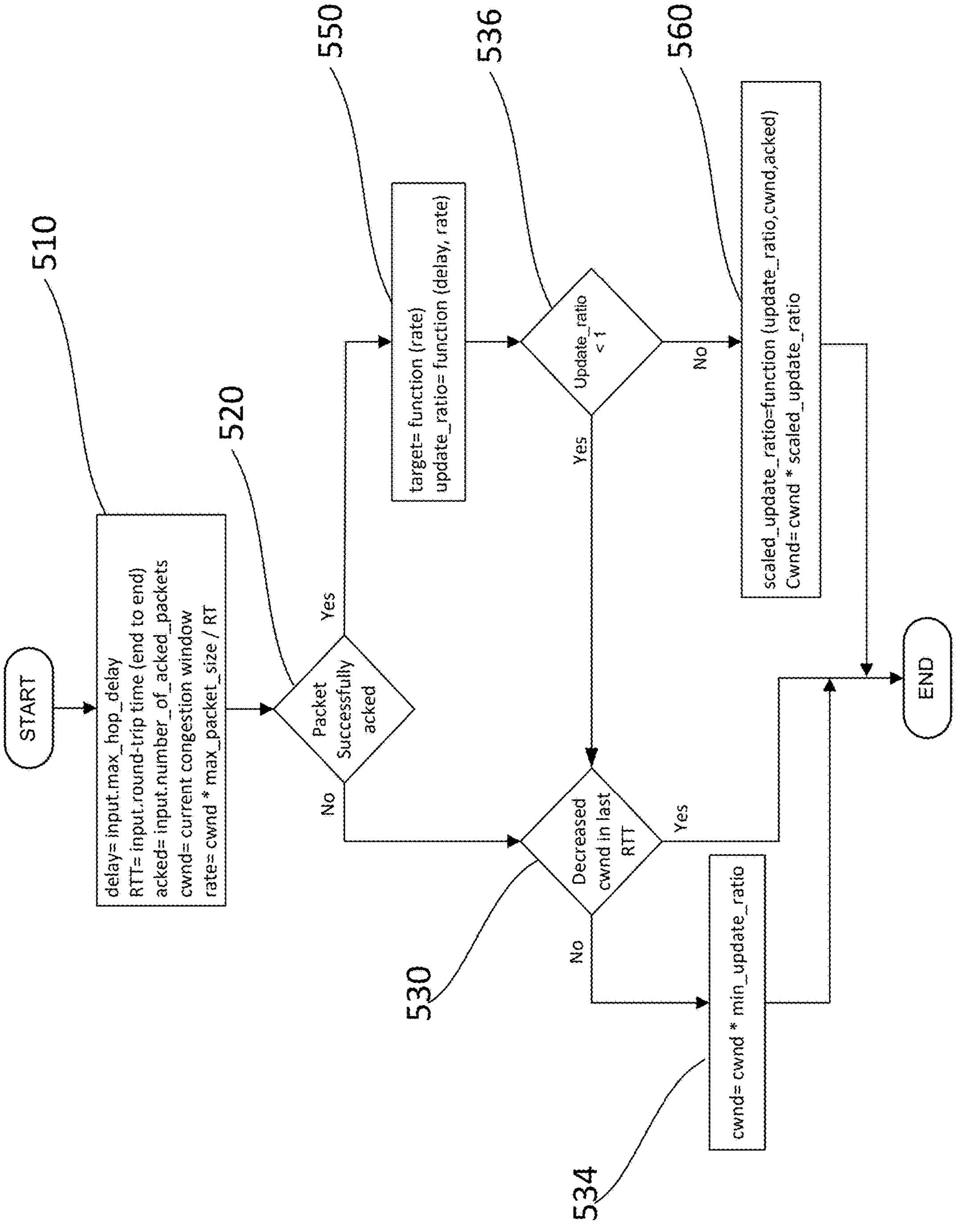
FIG. 5 illustratively depicts a method or process in accordance with an aspect of the disclosure.

FIG. 5 illustratively depicts a method or process 500 in accordance with an aspect of the disclosure. The process 500 begins with the delay being set to maximum hop delay (input.max_hop_delay) at block 510. In addition, other parameters such as the round-trip time (RTT), acknowledge count (acked), congestion window (cwnd), and rate are set as shown in block 510. At decision diamond 520, a determination is made at the source host as to whether a packet is acknowledged as successfully received. If the packet is not successfully acknowledged at decision diamond 520, processing proceeds to decision diamond 530 where it is determined whether the congestion window decreased in the last RTT. If the congestion window did not decrease in the last RTT, then the congestion window parameter is updated in accordance with block 534. On the other hand, if the congestion window decreased from the congestion window parameter, processing ends.

If, at decision diamond 520, a determination is made that the packet is acknowledged as successfully received, processing proceeds to block 550. At block 550, the target rate is updated in accordance with a rate function (function (rate)) and the update_ratio is updated in accordance with an update function based on delay and rate (function (delay, rate)). Eq. (3) above specifies how to figure out the target based on the rate and Eq. 4 shows how to calculate the update ratio. The new cwnd will be the older cwnd multiplied by the update ratio. From block 550, processing proceeds to decision diamond 536, where a determination is made of whether the update_ratio is less than 1. If the update_ratio is not less than 1, the scaled update ratio and congestion window are updated at block 560, and then processing ends. On the other hand, if the ratio is less than 1, processing proceeds to decision diamond 530, which is discussed above.

Figure 6:
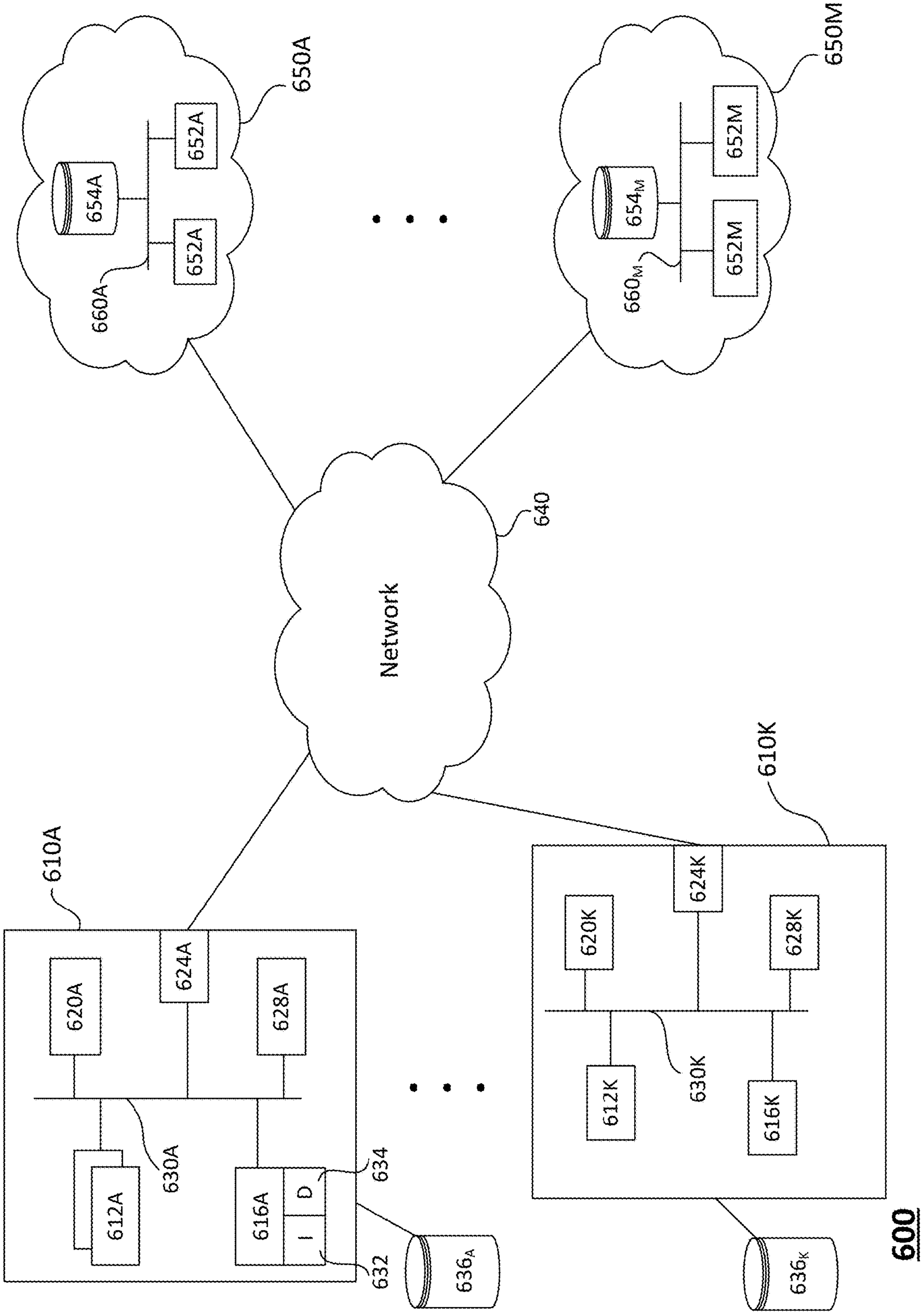
FIG. 6 illustratively depicts a system in accordance with an aspect of the disclosure.

FIG. 6 is a block diagram of an example cloud system 600, in accordance with aspects of the disclosure. System 600 includes one or more computing devices 610A-K, including devices 610A, 610K and optionally one or more other devices (not shown). In some implementations, the system 600 includes a single computing device 610A which operates as host machine 300. The system 600 also includes a network 640 and one or more cloud computing systems 650A-M, which can include cloud computing systems 650A and 650M. In some implementations, the system 600 includes a single cloud computing system 650A. Computing devices 610A-K may include computing devices located at customer locations that make use of cloud computing services. For example, if the computing devices 610A-K are located at a business enterprise, computing devices 610A-K may use cloud systems 650A-M as part of one or more services that provide software or other applications to the computing devices 610A-K.

As shown in FIG. 6, the computer devices 610A-K may respectively include one or more processors 612A-K, memory 616A-K storing data (D) 634A-K and instructions (I) 632A-K, displays 620A-K, communication interfaces 624A-K, and input systems 628A-K, which are shown as interconnected through network 630A-K. Each computing device 610A-K can be coupled or connected to respective storage device 636A-K, which may include local or remote storage, e.g., on a Storage Area Network (SAN), that stores data.

Each computing device 610A-K may include a standalone computer (e.g., desktop or laptop) or a server. The network 640 may include data buses, etc., internal to a computing device, and/or may include one or more of a local area network, virtual private network, wide area network, or other types of networks described below in relation to network 640. Memory 616A-K stores information accessible by the one or more processors 612A-K, including instructions 632A-K and data 634A-K that may be executed or otherwise used by the processor(s) 612A-K. The memory 616A-K may be of any type capable of storing information accessible by a respective processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 632A-K may be any set of instructions to be executed directly (such as machine code) or indirectly (such as scripts) by the processor. One or more instructions executed by the processors can represent an operation performed by the processor. For example, the instructions may be stored as computing device code on the computing device-readable medium. In that regard, the terms "instructions," "routines," and "programs" may be used interchangeably herein, which are executed by the processor to perform corresponding operations. The instructions may be stored in object code format for direct processing by the processor, or in any other computing device language, including scripts or collections of independent source code modules that are interpreted on demand or compiled in advance.

The data 634A-K may be retrieved, stored, or modified by processor(s) 612A-K in accordance with the instructions 632A-K. As an example, data 634A-K associated with memory 616A-K may include data used in supporting services for one or more client devices, an application, etc. Such data may include data to support hosting web-based applications, file share services, communication services, gaming, sharing video or audio files, or any other network-based services.

Each processor 612A-K may be any of any combination of general-purpose and/or specialized processors. The processors 612A-K are configured to implement a machine-check architecture or other mechanism for identifying memory errors and reporting the memory errors to a host kernel. An example of a general-purpose processor includes a CPU. Alternatively, the one or more processors may be a dedicated device such as a FPGA or ASIC, including a tensor processing unit (TPU). Although FIG. 6 functionally illustrates the processor, memory, and other elements of each computing device 610A-K as being within a single block, it will be understood by those of ordinary skill in the art that the processor, computing device, or memory may actually include multiple processors, computing devices, or memories that may or may not be located or stored within the same physical housing. In one example, one or more of the computing devices 610A-K may include one or more server computing devices having a plurality of computing devices, e.g., a load-balanced server farm, that exchange information with different nodes of a network for the purpose of receiving, processing, and transmitting the data to and from other computing devices as part of customer's business operation.

Computing devices 610A-K may include displays 620A-K, e.g., monitors having a screen, a touch-screen, a projector, a television, or other device that is operable to display information. The displays 620A-K can provide a user interface that allows for controlling the computing device 610A-K and accessing user space applications and/or data associated VMs supported in one or more cloud systems 650A-M, e.g., on a host in a cloud system. Such control may include, for example, using a computing device to cause data to be uploaded through input system 628A-K to cloud systems 650A-M for processing, cause accumulation of data on storage 636A-K, or more generally, manage different aspects of a customer's computing system. In some examples, computing devices 610A-K may also access an API that allow them to specify workloads or jobs that run on Virtual Machines (VMs) in the cloud as part of IaaS (Infrastructure-as-a-System) or SaaS (Service-as-a-System). While input system 628A-K may be used to upload data, e.g., a USB port, computing devices 610A-K may also include a mouse, keyboard, touchscreen, or microphone that can be used to receive commands and/or data.

The network 640 may include various configurations and protocols including short-range communication protocols such as Bluetooth™, Bluetooth™ LE, the Internet, World Wide Web, intranets, virtual private networks, wide area networks, local networks, private networks using communication protocols proprietary to one or more companies, Ethernet, Wi-Fi, HTTP, etc., and various combinations of the foregoing. Such communication may be facilitated by any device capable of transmitting data to and from other computing devices, such as modems and wireless interfaces. Computing devices 610A-K can interface with the network 640 through communication interfaces 624A-K, which may include the hardware, drivers, and software necessary to support a given communications protocol.

Network 640 may also implement network slicing. Network slicing supports customizing the capacity and capabilities of a network for different services, such as connected home, video/audio streaming (buffered or real-time), geolocation and route planning, sensor monitoring, computer vision, vehicular communication, etc. Edge data center processing and local data center processing augments central data center processing to allocate 5G, 6G, and future network resources to enable smartphones, AR/VR/XR units, home entertainment systems, industrial sensors, cars and other vehicles, and other wirelessly-connected devices. Not only can terrestrial network equipment support connected home, video/audio streaming (buffered or real-time), geolocation and route planning, sensor monitoring, computer vision, vehicular communication, etc., non-terrestrial network equipment can enable 5G, 6G, and future wireless communications in additional environments such as marine, rural, and other locations that experience inadequate base station coverage. As support for computer vision, objects counting, intrusion detection, motion detection, traffic monitoring, health monitoring, device or target localization, pedestrian avoidance, AR/VR/XR experiences, enhanced autonomous/terrestrial objects navigation, ultra high-definition environment imaging, etc., 5G, 6G, and future wireless networks enable fine-range sensing and sub-meter precision localization. Leveraging massive bandwidths and wireless resource (time, frequency, space) sharing, these wireless networks enable simultaneous communications and sensing capabilities to support radar applications in smart displays, smartphones, AR/VR/XR units, smart speakers, industrial sensors, cars and other vehicles, and other wirelessly-connected devices.

Cloud computing systems 650A-M may include one or more data centers that may be linked via high speed communications or computing networks. A data center may include dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent a given cloud computing system includes more than one data center, those data centers may be at different geographic locations within relatively close proximity to each other, chosen to deliver services in a timely and economically efficient manner, as well as to provide redundancy and maintain high availability. Similarly, different cloud computing systems are typically provided at different geographic locations.

As shown in FIG. 6, computing systems 650A-M may include host machines 652A-M, storage 654A-M, and infrastructure 660A-M. Host machines 652A-M may comprise host machine 300. Infrastructure 660A-M may include one or more switches (e.g., top of rack switches (TROs)), physical links (e.g., fiber), and other equipment used to interconnect host machines within a data center with storage 654A-M. Storage 654A-M may include a disk or other storage device that is partitionable to provide physical or virtual storage to virtual machines running on processing devices within a data center. Storage 654A-M may be provided as a SAN within the datacenter hosting the virtual machines supported by storage 654A-M or in a different data center that does not share a physical location with the virtual machines it supports. One or more hosts or other computer systems within a given data center may be configured to act as a supervisory agent or hypervisor in creating and managing virtual machines associated with one or more host machines in a given data center. In general, a host or computer system configured to function as a hypervisor will contain the instructions necessary to, for example, manage the operations that result from providing IaaS, PaaS (Platform-as-a-Service), or SaaS to customers or users as a result of requests for services originating at, for example, computing devices 610A-K.

Although the invention herein has been described with reference to particular embodiments, it is to be understood that these embodiments are merely illustrative of the principles and applications of the present invention. For instance, max_hop_latency is one signal that this disclosure is applicable to. Another signal may be minimum available bandwidth. In this instant, we set a target for the minimum available bandwidth that can be adjusted at runtime and make sure we maintain the minimum available bandwidth measured from the network around that target. It is therefore to be understood that numerous modifications may be made to the illustrative embodiments and that other arrangements may be devised without departing from the spirit and scope of the present invention as defined by the appended claims.

The invention claimed is:

1. A method for network congestion control, comprising:

detecting maximum hop delays at each hop along a path between a network source node and a network destination node;

determining, at a host machine associated with a hop along the path between the network source node and the network destination node, a maximum hop delay value from among the maximum hop delays detected at each hop, the maximum hop delay value being associated with a bottleneck hop along the path between the network source node and the network destination node; and effecting congestion control, at the host machine, based on the maximum hop delay value associated with the bottleneck hop by redistributing bandwidth to a first data flow with a first bandwidth demand from a second data flow with a second bandwidth demand where the second bandwidth demand is greater than the first bandwidth demand, and wherein the bottleneck hop comprises a congested hop that limits data packet flows that transmit more than their max-min fair-share rate, the max-min fair share rate comprising a rate that maximizes a minimum data flow.

2. The method of claim 1, comprising inserting, by respective in-network telemetry (INT) devices located at each hop along the path between the network source node and the network destination node, the maximum hop delay for each hop in a packet header of a respective message sent from each hop.

3. The method of claim 1, wherein inserting comprises inserting by an INT-enabled switch or an INT-enabled network interface card (NIC).

4. The method of claim 1, wherein the host machine is located at a source hop associated with the network source node.

5. The method of claim 1, wherein effecting congestion control comprises decreasing a transmission rate of only those data packet flows that transmit more than their max-min fair-share rate.

6. The method of claim 1, wherein effecting congestion control comprises comparing the maximum hop delay value detected at each hop to a rate-adjusted target hop delay associated with each respective hop.

7. The method of claim 6, comprising updating a congestion window update function at the host machine based on the comparison.

8. The method of claim 7, wherein updating comprises decreasing the congestion window only if the data packet flow got the max-min fair-share rate on congested hops along the path between the network source node and the network destination node.

9. A system, comprising
a source node;
a destination node;
one or more hops along a data path between the source node and the destination node; and
a host machine coupled to the source node, the host machine comprising one or more processing devices and one or more memories storing instructions that cause the one or more processing devices to:
detect maximum hop delays at each hop along the data path between the source node and the destination node;
determine a maximum hop delay value from among the maximum hop delays detected at each hop, the maximum hop delay value being associated with a bottleneck hop along the data path; and
effect congestion control based on the maximum hop delay value associated with the bottleneck hop by redistributing bandwidth to a first data flow with a first bandwidth demand from a second data flow with a second bandwidth demand where the second bandwidth demand is greater than the first bandwidth demand, and
wherein the bottleneck hop comprises a congested hop that limits data packet flows that transmit more than their max-min fair-share rate, the max-min fair share rate comprising a rate that maximizes a minimum data flow.

10. The system of claim 9, wherein the instructions cause the one or more processing devices to insert, by respective in-network telemetry (INT) devices located at each hop along the data path, the maximum hop delay for each hop in a packet header of a respective message sent from each hop.

11. The system of claim 9, wherein the INT devices comprises one of an INT-enabled switch or an INT-enabled network interface card (NIC).

12. The system of claim 9, wherein the host machine is located at the source node.

13. The system of claim 9, wherein to effect congestion control comprises decreasing a transmission rate of only those data packet flows that transmit more than their max-min fair-share rate.

14. The system of claim 9, wherein to effect congestion control comprises comparing the maximum hop delay value detected at each hop to a rate adjusted target hop delay associated with each respective hop.

15. The system of claim 14, wherein the instructions cause the one or more processing devices to update a congestion window at the host machine based on the comparison.

16. The system of claim 15, wherein to update comprises decreasing the congestion window only if the data packet flow got the max-min fair-share rate on congested hops along the path between the network source node and the network destination node.

* * * * *